No. 792,956. PATENTED JUNE 20, 1905.
A. D. ANGELE.
HARROW.
APPLICATION FILED JUNE 10, 1904.
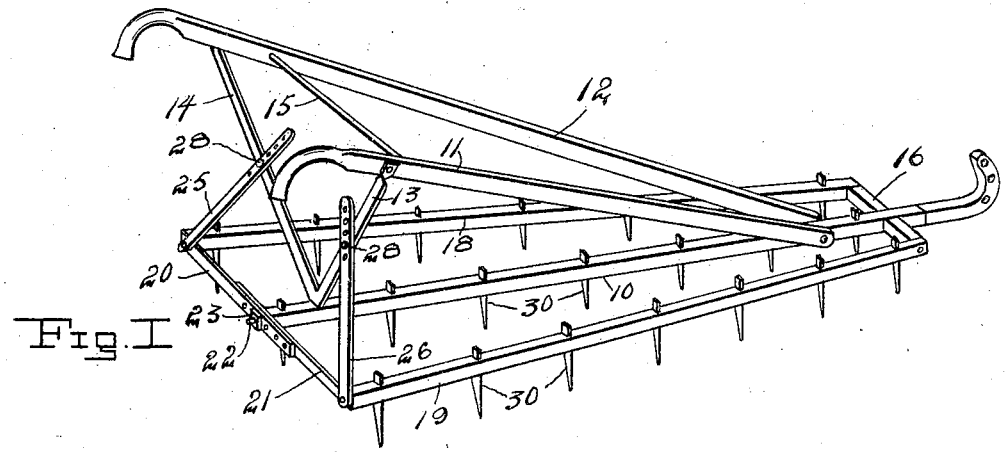
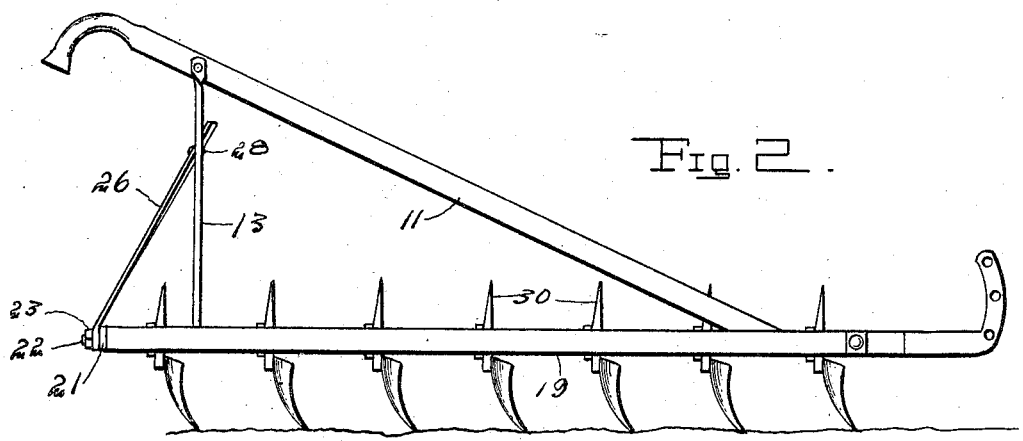
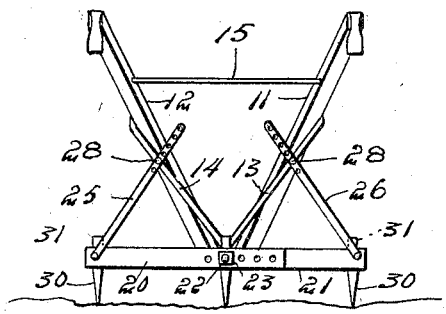

No. 792,956. Patented June 20, 1905.

UNITED STATES PATENT OFFICE.

ANDREW D. ANGELE, OF HILLSDALE, LOUISIANA.

HARROW.

SPECIFICATION forming part of Letters Patent No. 792,956, dated June 20, 1905.

Application filed June 10, 1904. Serial No. 212,024.

*To all whom it may concern:*

Be it known that I, ANDREW D. ANGELE, a citizen of the United States, residing at Hillsdale, in the parish of St. Helena, State of Louisiana, have invented certain new and useful Improvements in Harrows; and I do hereby declare the following to be a full, clear, and exact description of the invention, such as will enable others skilled in the art to which it appertains to make and use the same.

This invention relates to harrows, and has for its object to provide a construction which will be cheap, simple, and durable, which may be readily adjusted to correspond to different working conditions, and which will be efficient in its operation.

In the drawings forming a portion of this specification, and in which like numerals of reference indicate similar parts in the several views, Figure 1 is a perspective view showing a harrow embodying the present invention. Fig. 2 is a side elevation of the base of the harrow with the teeth reversed and having cultivator-shovels attached thereto. Fig. 3 is a rear end view of the harrow.

Referring now to the drawings, the present harrow comprises a central beam 10, the front end of which is adapted for attachment of draft appliances and to which in the rear of its front end are connected the handles 11 and 12, which diverge rearwardly, and to the rear portions of which are connected the downwardly-converging braces 13 and 14, which are connected at their lower ends to the beam 10. The handles have the usual connecting-brace 15.

Connected to the beam 10 in advance of the handles 11 and 12 is a cross-bar 16, to the ends of which are pivotally connected beams 18 and 19, which diverge rearwardly and lie at opposite sides of the beam 10. Hinged to the rear ends of the beams 18 and 19 are the members 20 and 21, which extend toward each other and are overlapped and are pivotally connected with the rear end of the beam 10, so that either beam 18 or 19 may be raised and lowered. The pivotal connections between the members 20 and 21 and the beam 10 may be made through the medium of a projecting pin 22 at the rear end of the beam 10 and perforations in the members 20 and 21, the pin having a nut 23 at its extremity to prevent disengagement of the members 20 and 21. Each of the members 20 and 21 has a longitudinal series of perforations to interchangeably receive the pin 22, so that the beams 18 and 19 may be adjusted toward and away from each other. By reason of the pivotal connections between the beams 18 and 19 and the beam 10 the beams 18 and 19 may be raised and lowered independently of each other, and to hold them at different elevations braces 25 and 26 are pivotally connected with the rear ends of the beams 18 and 19, and each has a longitudinal series of perforations therein which are designed to receive bolts 28, engaged through the braces 13 and 14. By engaging these bolts with different perforations of the series the beams 18 and 19 will be held at different elevations.

The beams 10, 18, and 19 are provided with harrow-teeth 30, which may be secured thereto in any suitable manner.

From the above description it will be seen that the width of the harrow may be adjusted to correspond to the spacing of the rows and that either of the side beams may be raised or lowered to suit different conditions of use.

It will be understood that in practice modifications of the specific construction shown may be made, and any suitable materials and proportions may be used for the various parts without departing from the spirit of the invention.

What is claimed is—

A farm implement comprising a central beam having means at its forward end for attachment of draft appliances, the opposite end face of the beam having a projection, handles attached to the forward end of said beam and extending upwardly and rearwardly therefrom, braces connected between the handles and said beam intermediate the ends of the latter, additional beams at the sides of the first-named beam and hinged thereto at their forward ends for movement toward and away from the first-named beam, and for vertical movement, a member connected to the rear end of each side beam and having perforations, the said members overlapping with their corresponding perforations registering, the registering perforations being adapted for interchangeable connection with the aforesaid projection of the first-named beam for holding said beams against separation, and other members connected to the rear ends of the side beams and converging upwardly toward each other and overlapping the aforesaid braces, the last-named members being adjustably associated with the braces.

In testimony whereof I affix my signature in presence of two witnesses.

ANDREW D. ANGELE.

Witnesses:
J. H. WOMACK,
WILSON S. HOLLAND.